United States Patent [19]

Kueck et al.

[11] Patent Number: 5,628,191
[45] Date of Patent: May 13, 1997

[54] NATURAL GAS EXPANSION PLANT

[75] Inventors: Elmar Kueck, Bedburg; Heinz Siefen, Leverkusen; Wolf-Ruediger Canders, Osterode, all of Germany

[73] Assignees: Energieversorgung Leverkusen GmbH; Piller GmbH, both of Germany

[21] Appl. No.: 436,278

[22] PCT Filed: Nov. 17, 1993

[86] PCT No.: PCT/EP93/03223

§ 371 Date: May 16, 1995

§ 102(e) Date: May 16, 1995

[87] PCT Pub. No.: WO94/11626

PCT Pub. Date: May 26, 1994

[30] Foreign Application Priority Data

Nov. 18, 1992 [DE] Germany ............................ 9215695 U

[51] Int. Cl.$^6$ .................................................... F01K 23/04
[52] U.S. Cl. .................................. 60/655; 60/682; 60/719
[58] Field of Search ............................ 60/655, 648, 682, 60/684, 719; 261/138, 127

[56] References Cited

U.S. PATENT DOCUMENTS

| | | | |
|---|---|---|---|
| 4,387,575 | 6/1983 | Wenzel ........................ | 60/648 |
| 4,537,032 | 8/1985 | Kaplan ......................... | 60/719 |
| 4,555,637 | 11/1985 | Irvine .......................... | 290/52 |
| 4,638,173 | 1/1987 | Milton ......................... | 290/52 |
| 4,693,072 | 9/1987 | McLean et al. ................ | 60/39.02 |

FOREIGN PATENT DOCUMENTS

| | | |
|---|---|---|
| 0004398 | 10/1979 | European Pat. Off. . |
| 0453077 | 10/1991 | European Pat. Off. . |
| 2515315 | 10/1976 | Germany . |
| 0453007 | 10/1991 | Netherlands . |
| 2047817 | 12/1980 | United Kingdom . |

OTHER PUBLICATIONS

A. Mirandola and L. Minca, "Energy Recovery By Expansion of High Pressure Natural Gas," American Chemical Society, San Diego 21st Intersociety Energy Conversion Engineering Conference, Aug. 25–29, 1986.

"Suspending Rotating Shafts in Midair," *Compressed Air*, Apr. 1985.

"Magnetic Auxiliary Bearing for Sulzer Gas Bearing Turbines," *Cryogenics*, vol. 17, No. 7, 1977.

Gneuss "Nutzung von Druckenergie durch Gasexpansionsmortoren" Bwk Brennstoff Warme Kraft Bd. 35, Nr. 10, Oct. 1, 1983, pp. 428–432.

Mirandola et al. "Energy Recovery by Expansion of High Pressure Natural Gas," *American Chemical Society*, 21st Intersociety Energy Conversion Energy Conference pp. 16–21.

"Suspending Rotating Shafts in Midair" *Compressed Air*, vol. 90, No. 4, Phillipsburg, US, Apr. 1, 1985, pp. 30–33.

"Magnetic Auxilliary Bearing for Sulzer Gas Bearing Turbines" *Cryogenics*, Great Britain, vol. 17, No. 7, Jul. 1, 1977.

*Primary Examiner*—Ira S. Lazarus
*Assistant Examiner*—Nhat-Hang H. Lam
*Attorney, Agent, or Firm*—Diller, Ramik & Wight, PC

[57] ABSTRACT

For expanding highly pressurized natural gas, use is made of a turbo generator (13) having a heat exchanger (12) connected at its upstream side. Heat supply to the heat exchanger (12) is performed by at least one block-type thermal power station (16) comprising a gas-fired internal combustion engine and a generator. The heat exchanger preheats the gas to be expanded before the gas is supplied to the turbo generator for expansion. Both the block-type thermal power station (16) and the turbo generator (13) generate electric energy which is fed into the power supply network (18).

5 Claims, 2 Drawing Sheets

NATURAL GAS EXPANSION PLANT

The invention is directed to a natural gas expansion plant provided to expand natural gas supplied at high pressure and to be fed at a lower pressure into a distribution supply network leading to the end users.

In long-distance pipelines, natural gas is subjected to a relatively high pressure of about 55 bar, whereas a lower pressure, e.g. 9 bar, prevails in the end user network. At the junction from the long-distance pipeline network to the distribution supply network, natural gas expansion plants are required for reducing the pressure. During the pressure reduction process, energy is released which can be used to generate electricity. In natural gas expansion plants, it is known to use piston expansion engines, operating as volumetric displacement engines, for driving a generator. In further known expansion plants, expansion turbines are used. In these plants, oil is used for lubricating the bearings. Since the natural gas will cool down during expansion, the natural gas is heated up prior to expansion to such an extent that the temperature will not cool down to a value below the critical range of 0° C. This requirement provides that the plant is insensitive to humidity contained in the natural gas. The heating process requires the provision of thermal energy. Normally, this thermal energy is generated by heating boiler plants.

A gas expansion plant known from EP-A-0 004 398 comprises a power plant consisting of a motor and a power generator. The waste heat of the motor is supplied to a heat exchanger for preheating the gas flowing to an expansion turbine. The amount of heat transmitted to the gas cannot be changed without abandoning the full-load operation of the motor.

It is an object of the invention to provide a natural gas expansion plant which, irrespective of the present need for expanded natural gas, always operates with high efficiency and, respectively, good utilization of energy.

According to the invention, the above object is solved by the features indicated in claim 1.

According to the invention, the energy supplied to the heat exchanger connected upstream of the turbo generator is generated by at least one block-type thermal power station comprising a gas-fired internal combustion engine and a generator for electric power generation. For preheating the natural gas, the waste heat of the block-type thermal power station is used which is driven in full-load operation. A block-type thermal power station has its highest efficiency in full-load operation, whereas the efficiency is considerably reduced in part-load operation. According to the invention, the block-type thermal power station is either run in full-load operation or is switched off, as required by the natural gas network. Thus, operation is always performed with high efficiency, with the generator of the block-type thermal power station generating electric energy which can be fed into the power supply network. Also on cold winter days, when the demand for natural gas is high, the block-type thermal power stations will produce considerable electric power, which contributes to meet the likewise increased electric power requirement.

According to the invention, the heat supplied to the natural gas prior to expansion of the gas is generated by respective limited, relatively small units, i.e. the block-type thermal power stations, which also release, in form of electric power, a part of the energy received by them. This generation of electric power is obtained as a sort of by-product, but is appreciated because it occurs in situations when the power requirement is particularly high.

Preferably, the increase in temperature of the natural gas caused by the heat exchangers will raise the gas temperature to a temperature below 100° C., thus allowing the use of gas motors—wherein the cooling water is below 100° C.—in the block-type thermal power stations. On the other hand, due to the enthalpy/entropy diagram for natural gas, the above low preheating temperatures allow only pressure ratios of up to about 2–3,5 to be reduced in one step with excellent efficiency. If the existing pressure difference exceeds these conditions, considerably higher preheating temperature are required if good efficiency is desired.

If the preheating temperatures are restricted to values below 100° C., multi-stage expansion with intermediate heating is advisable.

The centripetal turbine used in the invention, designed for radial onflow and being a kind of Francis turbine for compressible media, is an expansion machine adapted for one-stage, highly efficient reduction of pressure ratios of about 3. Volume flow and capacity are controlled through adjustable guide vanes. Because of the guide vane mechanism, this turbine, contrary to many other turbines, offers excellent efficiency also in the part-load range.

A radial turbine wheel subjected to onflow from above is directly fastened to the free shaft end of a medium-frequency generator encapsulated in a pressure-tight manner and supported by magnetic bearings.

The magnetically supported generator is operated without any lubricating agents in its bearings. Thus, contamination of the natural gas by oil is not at all possible. The losses in the magnetic bearings are at least one decimal power below those in known oil-lubricated bearings. The pressure-tight encapsulated casing prevents leakage of natural gas from the generator-turbine unit.

The heat developed in the generator pack due to energy losses is eliminated by a cooling water circuit and can again be entered into the expansion process via heat exchangers.

Since the generator rotates with the rotational speed of the turbines, direct infeed into the public power supply network (50 Hertz) is not possible. The medium-frequency current (up to about 1100 Hertz depending on the generator type) is first rectified in a converter adapted to the generator and then, via a frequency converter, is fed into the public power supply network of 3×400 V, 50 Hertz. The circuitry of the frequency converter is designed in such a manner that the harmonic content of the network-side currents complies with the requirements of energy suppliers. In case of higher current power, it appears useful to feed the energy, via a suitable transformer, into the medium-high-voltage network (e.g., 10 kV).

The absence of slide bearings and roller bearings as well as the absence of shaft seals and lubricants safeguards that no foreign matters will penetrate into the gas pipe and contaminate the gas.

An embodiment of the invention will be explained in greater detail hereunder with reference to the Figures.

Figure 1:
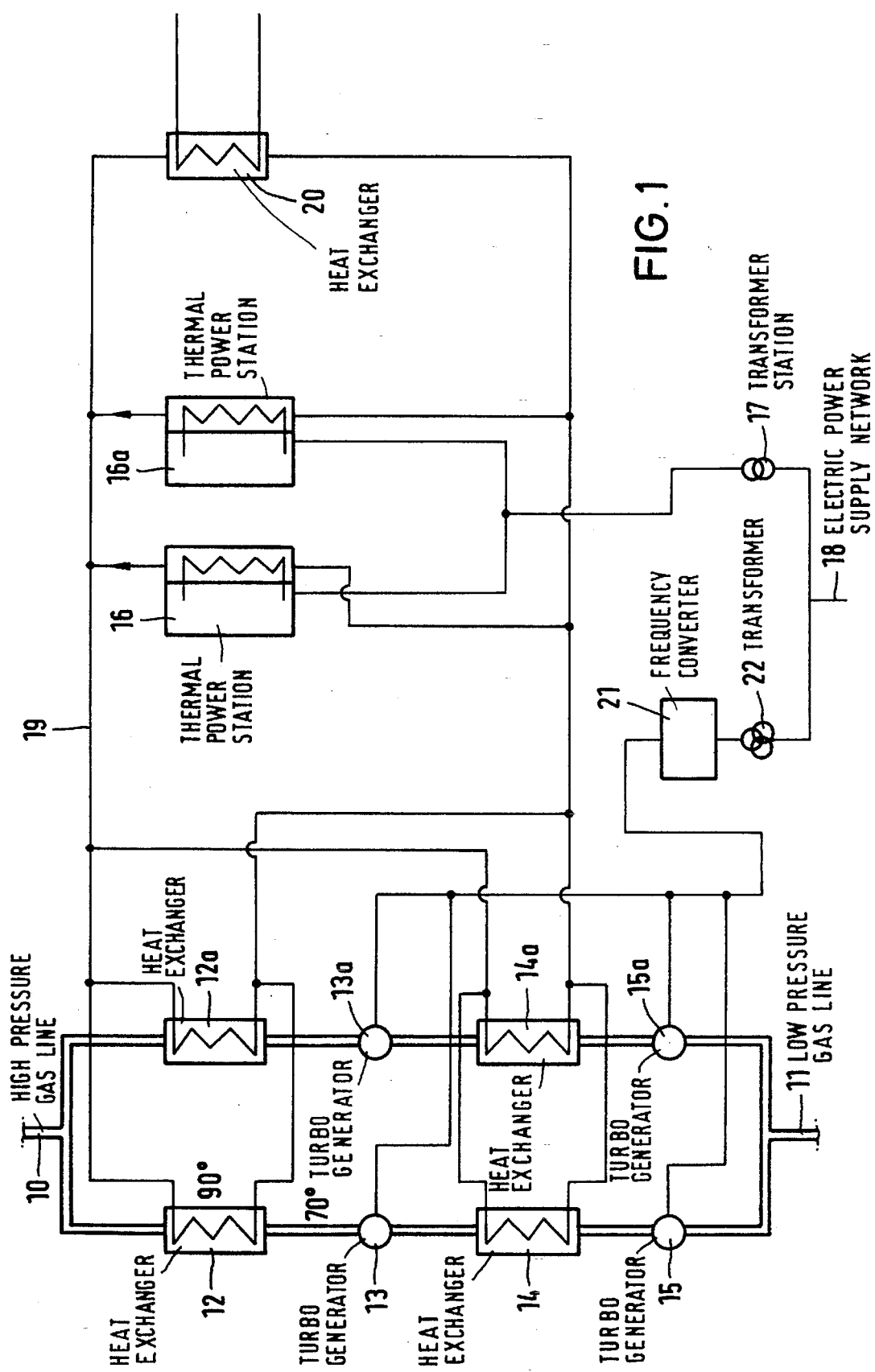
FIG. 1 is a block diagram of the natural gas expansion plant.

The natural gas expansion plant illustrated in FIG. 1 is supplied with natural gas having a temperature therein of 5° to 10° C. through a high-pressure line 10 having an internal pressure of, e.g., 55 bar. The low-pressure line 11 leaving the expansion plant is connected to the natural gas supply network wherein the pressure is about 5 bar and the temperature lies within a range from 5° to 10° C.

From high-pressure line 10, the natural gas flows through a heat exchanger 12 for being heated to a temperature below 100° C., e.g. 70° C., and then flows through a turbo generator 13 wherein the pressure is relieved to decrease to about 22 bar. Turbo generator 13 has a further heat exchanger 14 and a further turbo generator 15 connected at its output side. The outlet of turbo generator 15 is connected to low-pressure line 11.

The series connection of heat exchanger 12, turbo generator 13, heat exchanger 14 and turbo generator 15 can be connected in parallel to a series connection composed of the same components, designated by an additional letter "a". The two parallel branches are connected between high-pressure line 10 and low-pressure line 11.

The heat exchangers 12,12a and 14,14a receive thermal energy from a parallel arrangement of a plurality of block-type thermal power stations 16, 16a. All heat exchangers 12,12a,14,14a are directly connected to an arrangement of block-type thermal power stations so that all heat exchangers form a parallel connection. The block-type thermal power stations together with all heat exchangers form a closed heat transfer circuit 19, with—e.g.—water circulating therein to serve as a heat transfer medium.

Each block-type thermal power station consists of a gas engine powered by tie natural gas supplied from low-pressure line 11, and a generator driven by the gas engine to generate electricity. The output voltages of the generators are transformed to mains voltage by a transformer station 17 and then are fed into the electric power supply network 18. The gas engines drive the generators at a speed controlled in such a manner that the generated alternating voltage will have a frquency identical with the mains frequency and be in phase with the electric power supply network.

For the required preheating of the natural gas, use is made of block-type thermal power station engines with lean combustion. The lean combustion precludes the generation of nitrogen oxide by merely engine-related measures directly on combustion. Even without catalysts, the cleanness of the exhaust gases can be brought close to the values of systems with three-way catalysts. The engine control electronics will control the plant to specific gas treatment and combustion conditions which are stable in continuous operation. Efficiency is considerably higher if, among other factors, by use of charged fuel mixtures.

Of the primary energy used, 35.4% mechanical energy are released at the engine flywheel. The generator transforms the motive energy into a portion of 33.9% of electric energy which is supplied to the local network. The portion of 61.7% of thermal energy to be withdrawn—derived from the exhaust gases, the engine cooling water and the lubricating oil—is supplied via cooling water and exhaust heat transmitters to the heating plant, making up 57.3% of useful thermal energy.

100% fuel energy is transformed into a portion of 33.9% of electric energy and a portion of 57.3% of thermal energy. This results in an extraordinarily high efficiency of 91.2%. The loss will be only 8.8%.

The waste heat of the block-type thermal power stations 16,16a which is taken up by circuit 19 including the heat exchangers 12,12a,14,14a, is partially used for heating the natural gas. Circuit 19 includes a further heat exchanger 20 which is coupled to an external energy consumer or energy generator, e.g., to the return line of a long-distance heating network. In this manner, heat which has been generated by the block-type thermal power stations and has not been withdrawn by the heat exchangers 12,12a,14,14a, can be fed into the long-distance heating network or be supplied to another consumer.

The power generated by the turbo generators 13,13a, 15,15a is supplied to a frequency converter 21 wherein the power is adapted to mains frequency. Subsequently, a transformer 22 performs a transformation to the level of the mains voltage prior to feeding the power into power supply network 18.

Thus, power is generated both during heat generation in the block-type thermal power stations and during expansion in the turbo generators, and is fed into the power supply network.

Circuit 19 takes up the waste heat of the block-type thermal power stations 16,16a, i.e. the exhaust heat and the heat due to energy losses, and transmits this energy to the respective heat exchangers. For instance, the heat transfer medium (water) has an initial temperature slightly below 100° C. so that the temperature in the heat exchangers is about 90° C., causing heat-up of the natural gas to about 70° C. in each case.

Figure 2:
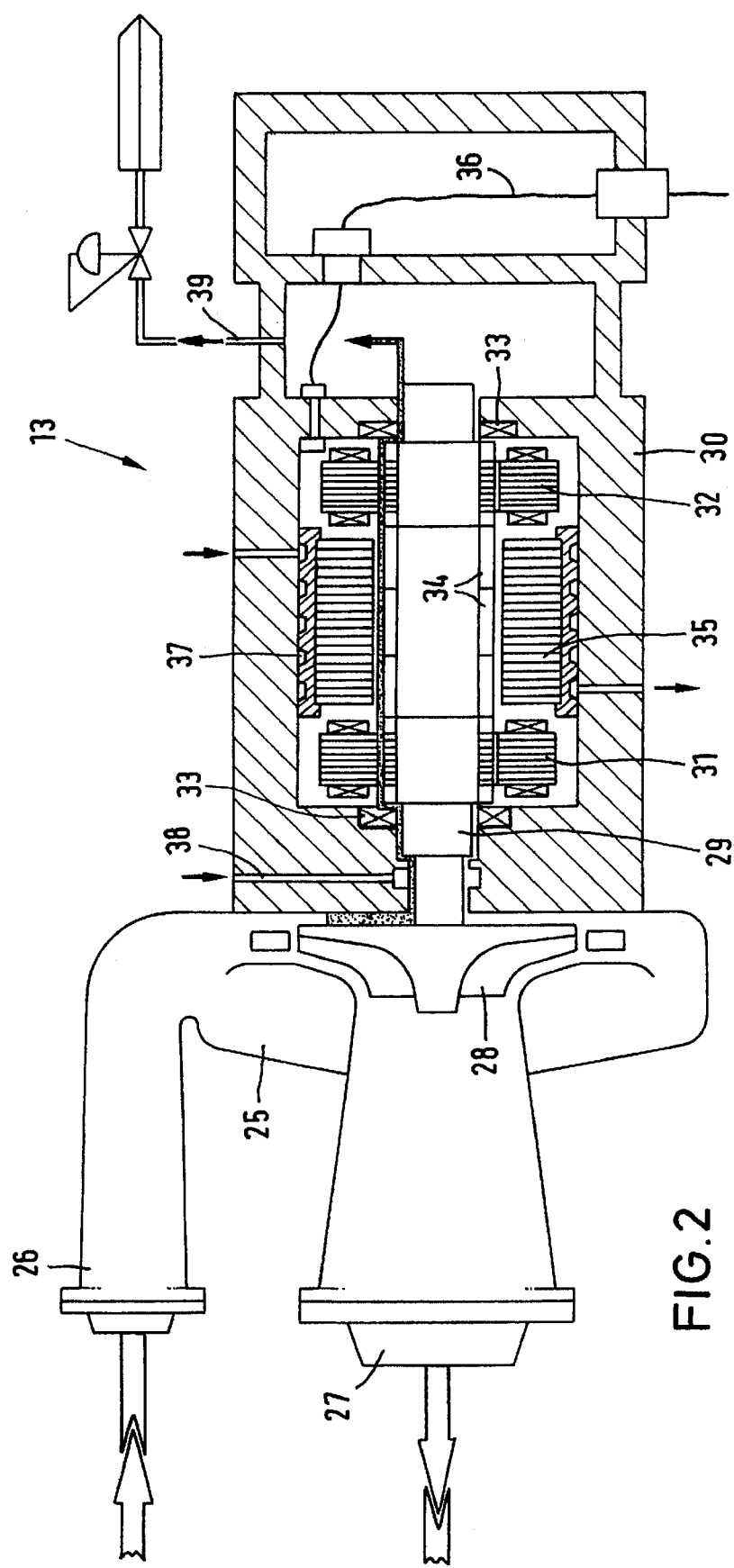
FIG. 2 is a systematic sectional view of one of the turbo generators.

FIG. 2 schematically shows the configuration of turbo generator 13 in which the expansion of the natural gas takes place. The other turbo generators have the same configuration.

Turbo generator 13 comprises an expansion turbine 25 having a radial inlet 26 and an axial outlet 27. Turbine 25 rotatably supports a turbine wheel 28 subjected to a radial onflow of the highly pressurized (55 bar) natural gas and thereby being rotated. Turbine wheel 28 is fastened to a shaft 29 supported in the generator casing 30. Generator casing 30 is arranged immediately adjacent to the turbine casing, and shaft 29 projects out of generator casing 30 into the turbine casing. Except for the shaft fitting leading into the turbine casing, generator casing 30 is completely encapsulated, i.e. shaft 29 is guided out of generator casing 30 only towards the turbine casing. Shaft 29 is supported by magnetic bearings 31,32,33, of which the magnetic bearings 31 and 32 are radial bearings and the magnetic bearing 33 is an axial bearing. The magnetic bearings hold the rotating shaft 29 magnetically suspended to support the shaft in a contactless manner. Further, safety catch bearings are provided for supporting shaft 29 in case of non-activation of the magnetic bearings. The position of shaft 29 is monitored by sensors (not shown) arranged in a circle. For each magnetic bearing, a dedicated ring-shaped sensor is provided. The signals of the sensors are processed in separate control circuits for controlling the magnetic bearings.

The shaft 29 of the rotor is provided with permanent magnets 34 forming the rotor of the synchronous generator. The stator consists of laminated electric sheets and generator coils 35 fastened in casing 30 and connected to frequency converter 21 (FIG. 1) via cables 36. Cooling of the stator is performed through cooling ducts 37 having cooling water flowing therethrough.

Here, the interior of casing 30 is cooled by gas which is withdrawn from the turbine casing through the leakage gap of shaft 29. Additionally or alternatively, external cooling gas can be infed into casing 30 through a gas inlet 38. The gas flows through the annular gaps of axial bearings 31 and 33 and along the rotor and is discharged through a cooling outlet 39 at the opposite end of the casing. Since casing 30 does not contain any moving parts subject to friction by interaction with other parts, no abrasion is generated so that no foreign particles can penetrate into the turbine casing. Turbo generator 13 is designed to be pressure-tight so that even in case of a secondary quick-action shut-down (at outlet 27), no natural gas will leak into the atmosphere. Support of shaft 29 is lubricant-free. The power loss of the turbo generator substantially consists in the gas-friction losses and the ohmic losses, as well as eddy-current losses. The waste heat is fed back into the natural gas.

We claim:

1. A natural gas expansion plant comprising at least one heat exchanger (12) for preheating highly pressurized natural gas, at least one turbo generator (13) for expanding the natural gas to reach a lower pressure and for generating power from the energy released during said expansions, a means for conducting natural gas from a first heat exchanger (12) to a first turbo generator (13), a power station (16, 16a) having a portion of its waste heat supplied to the first heat exchanger via a waste heat circuit (12), the power station (16, 16a) includes a plurality of block-type thermal power stations (16, 16a) each having a gas-fired internal combustion engine and a generator adapted to be individually selectively switched off or run under full-load conditions in digital operation, and said waste heat circuit (19) from the block-type thermal power stations which (16, 16a) is thermally coupled to an external energy consumer or energy generator to discharge a portion of residual heat which is generated in digital operation of the block-type thermal power stations (16, 16a) without external cooling measures.

2. The natural gas expansion plant according to claim 1 wherein the heating of the natural gas in the heat exchanger (12) is performed to a temperature below 100° C.

3. The natural gas expansion plant according to claim 1, wherein said first turbo generator (13) is connected in series to a second turbo generator (15), and each of said turbo generators (13, 15) has a respective first and second heat exchanger (12, 14) connected at its upstream side.

4. The natural gas expansion plant according to claim 1 wherein the turbo generator (13) comprises a shaft supported in a contactless manner by magnetic bearings (31, 32, 33), and a closed pressure-tight casing (30).

5. The natural gas expansion plant according to claim 3 wherein the block-type thermal power stations (16, 16a) are provided to heat, in parallel to each other and via a hot water circuit, a plurality of parallel expander conduits in mutual redundancy.

* * * * *